(12) United States Patent
Lim et al.

(10) Patent No.: US 6,937,258 B2
(45) Date of Patent: Aug. 30, 2005

(54) FLAT PANEL DISPLAY DEVICE

(75) Inventors: Chul-Ho Lim, Seoul (KR); Soo-Yen Lim, Seoul (KR)

(73) Assignee: ED-Tech Co., Ltd., Seoul (KR)

( * ) Notice: Subject to any disclaimer, the term of this patent is extended or adjusted under 35 U.S.C. 154(b) by 143 days.

(21) Appl. No.: 10/073,793

(22) Filed: Feb. 11, 2002

(65) Prior Publication Data

US 2002/0140651 A1 Oct. 3, 2002

(30) Foreign Application Priority Data

Feb. 19, 2001 (KR) ................................. 10-2001-000815

(51) Int. Cl.[7] .............................. G09F 1/16; H05K 7/20
(52) U.S. Cl. ......................... 345/905; 361/719; 361/87
(58) Field of Search .......................... 345/905, 98, 100, 345/211; 361/719, 681, 687

(56) References Cited

U.S. PATENT DOCUMENTS

| | | | | |
|---|---|---|---|---|
| 5,953,206 A | * | 9/1999 | Jondrow | 361/687 |
| 6,002,385 A | * | 12/1999 | Silverbrook | 345/100 |
| 6,065,076 A | * | 5/2000 | Sorenson | 710/72 |
| 6,489,932 B1 | * | 12/2002 | Chitturi et al. | 345/30 |
| 6,512,670 B1 | * | 1/2003 | Boehme et al. | 361/681 |
| 6,606,088 B1 | * | 8/2003 | Yang et al. | 345/211 |

\* cited by examiner

*Primary Examiner*—Xiao Wu
*Assistant Examiner*—Kevin M. Nguyen
(74) *Attorney, Agent, or Firm*—Cooper & Dunham LLP

(57) ABSTRACT

Disclosed is a flat panel display device including a modular system board structured to be separably mounted to the flat panel display device so that it is replaceable with a new one having a different function, thereby being capable of easily changing its function or application by a replacement of the modular system board with a new one corresponding to the changed function or application while achieving a reduction in the manufacturing costs and an effective shielding of electromagnetic waves. The flat panel display device includes a timing controller for controlling the outputting of image control signals from column and row drivers, a first connector electrically connected to the timing controller and adapted to transmit an input image signal to the timing controller, a replaceable modular system board electrically connected to the first connector and adapted to output video control signals to the flat panel module in accordance with a function allocated thereto, and a chassis adapted to mechanically fix and clamp all components of the flat panel display device and adapted to shield electromagnetic waves generated from the system board, thereby preventing an external discharge of the electromagnetic waves.

2 Claims, 6 Drawing Sheets

FLAT PANEL DISPLAY DEVICE

BACKGROUND OF THE INVENTION

1. Field of the Invention

The present invention relates to a flat panel display, and more particularly to a flat panel display device including a modular system board structured to be separably mounted to the flat panel display device so that it is replaceable with a new one having a different function, thereby being capable of easily changing its function or application by a replacement of the modular system board with a new one corresponding to the changed function or application while achieving a reduction in the manufacturing costs and an effective shielding of electromagnetic waves.

2. Description of the Related Art

Generally, flat panel displays are known as a device for displaying an image using a liquid crystal display (LCD). Such flat panel displays may be classified into various types in terms of applications and functions. For example, flat panel displays are classified into those for monitors, TVs, E-books, and Web. The function of a flat panel display is determined by respective functions of a system circuit card used and associated circuit boards. Where it is desired to change the function of a flat panel display, this flat panel display should be provided with a system circuit card newly designed to meet the changed function.

Now, the configuration of a conventional flat panel display will be described in conjunction with FIGS. 1 to 3.

FIG. 1 is a functional block diagram illustrating the conventional flat panel display. FIG. 2 is a perspective view illustrating the outer structure of the conventional flat panel display. FIG. 3 is a sectional view illustrating the cross-sectional structure of the conventional flat panel display.

The conventional flat panel display illustrated in FIG. 1 comprises an LCD serving to display an image in accordance with a control signal inputted thereto. As shown in FIG. 1, this flat panel display includes a flat panel module 10 adapted to control a plurality of pixels via control lines associated with those pixels to display an image, column drivers 20 adapted to control column ones of the control lines included in the flat panel module 10, respectively, and row drivers 30 adapted to control row ones of the control lines included in the flat panel 10, respectively. The flat panel display also includes a timing controller 40 for controlling the column drivers 20 and row drivers 30 to form an image on the flat panel module 10, a buffer 50 for storing, in the form of a voltage signal, a reference gray-scale brightness of each pixel displayed on the flat panel module 10 under the control of the timing controller 40, connection units 60 and 65 each adapted to receive external signals via the flat panel module 10 and to match the received signals together to output the matched signal, and system PC board controllers 70 for generating an image signal, to be displayed on the flat panel display 10, in such a fashion that the image signal meets a desired application or function.

Now, the operation of the conventional flat panel display having the above mentioned configuration will be described in conjunction with FIGS. 1 to 3.

The flat panel module 10 forms a plurality of pixels using an LCD. Each of the pixels is electrically connected to associated ones of column and row control lines so that it receives control signals from the associated control lines.

In order to display an image or video on the flat panel module 10, the column and row control lines should be controlled. When a column line control signal is outputted from an associated one of the column drivers 20, it is applied to the associated column control line via a column tape package (TCP) 25.

Each row driver 30 outputs a row control signal for controlling an associated one of the row control lines. The row control signal is applied to the associated row control line via a row TCP 35.

Each column driver 20 and each row driver 30 are driven by signals outputted from the timing controller 40, respectively. The timing controller 40 performs an operation for controlling the brightness of each pixel, based on an image signal outputted from the system PC board controller 70 via the connection units 60 and 65 in accordance with a desired application or function, along with the gray-scale brightness reference outputted from the buffer 50. In accordance with the control operation, the timing controller 40 outputs control signals.

The output signals from the timing controller 40 are applied to the column drivers 20 and row drivers 30 which, in turn, apply those signals to control lines associated with respective pixels of the flat panel module 10 via the column TCPs 25 and row TCPs 35. Thus, a desired image or video is displayed on the flat panel module 10.

A detailed structure of the conventional flat panel display will be described in conjunction with FIGS. 2 and 3. Typically, the flat panel module 10, which includes a plurality of pixels to display an image or video, is arranged as an uppermost layer. A light dispersing plate 110, which serves to uniformly disperse light over the flat panel module 10, is arranged beneath the flat panel module 10. A plurality of back lighting members 100 are arranged at opposite sides of the light dispersing plate 110. Each back lighting member 100 serves to generate back light in order to allow the image or video displayed on the flat panel module 10 to be well viewed.

Beneath the light dispersing plate 110, a protective plate 120 is arranged which is made of a plastic material. The protective plate 120 is provided with a plurality of recesses for supporting printed circuit boards (PCBs) while providing a buffering effect for the PCBs. The column drivers 20, which serve to control respective column control lines, are fitted in associated ones of the recesses formed at the protective plate 120 respectively. The column TCPs 25, which serve to transmit respective control signals outputted from the column drivers 20 to the flat panel module 10, are arranged outside the column drivers 20 respectively.

The row drivers 30, which serve to control respective row control lines, are fitted in associated ones of the recesses formed at the protective plate 120 respectively. The row TCPs 35, which serve to transmit respective control signals outputted from the row drivers 30 to the flat panel module 10, are arranged outside the row drivers 30 respectively.

The timing controller 40 for outputting control signals adapted to control the column drivers 20 and row drivers 30 and the system PC board controller 70 for controlling the timing controller 40 are also fitted in the remaining recesses of the protective plate 120, respectively.

In the manufacture of the flat panel display having the above mentioned arrangement, the flat panel module 10 is first arranged as the uppermost layer of the flat panel display. The light dispersing plate 110 serving to uniformly disperse light over the flat panel module 10 is then arranged beneath the flat panel module 10. As mentioned above, the light dispersing plate 110, which serves as an illuminator for allowing the image or video displayed on the flat panel display 10 to be well viewed, is provided at opposite sides thereof with back lighting members 100 serving to prevent the flat panel module 10 from being damaged due to an external impact while supporting the flat panel module 10 having a low mechanical strength.

The protective plate 120 made of a plastic material is then arranged beneath the light dispersing plate 110. As mentioned above, the protective plate 120 is provided with a plurality of recesses for protecting PCBs from an external impact while providing a buffering effect for the PCBs.

The resulting structure obtained after the above mentioned arrangement is then inserted into a space defined by a chassis 80. The space of the chassis 80 is subsequently closed by a cover 90 in a sealed fashion.

However, the conventional flat panel display having the above mentioned configuration is designed for a unique application. Where it is desired to change the application of the flat panel display, it is necessary to re-design the system PC board controller 70. Furthermore, the re-designing of the system PC board controller 70 requires an increased time. In addition, the entire thickness of the flat panel display is increased due to the system PC board controller 70.

Moreover, there is a problem in that it is necessary to use expensive connection cables exhibiting a reduced electro-magnetic interference (EMI) in order to electrically connect the circuit boards 20, 30, 50, 60, 65, and 70 fitted in the recesses of the protective plate 120.

SUMMARY OF THE INVENTION

Therefore, an object of the invention is to provide a flat panel display device including a system controller adapted to perform a function allocated for the flat panel display device and structured in the form of a modular system board configured to be separably inserted into an insertion hole formed at a chassis of the flat panel display device so that it is replaceable with a new one having a different function, thereby being capable of easily changing its function or application by a replacement of the modular system board with a new one corresponding to the changed function or application.

In accordance with the present invention, this object is accomplished by providing a flat panel display device comprising: a flat panel module for receiving image control signals applied to column and row control lines and displaying an image through a plurality of LCD pixels based on the received image control signals; column drivers each adapted to output an image control signal to an associated one of the column control lines, thereby driving associated ones of the LCD pixels included in the flat panel module; row drivers each adapted to output an image control signal to an associated one of the row control lines, thereby driving associated ones of the LCD pixels; a buffer for storing a reference voltage for a gray-scale brightness reference; a timing controller for controlling the outputting of the image control signals from the column and row drivers; a first connector electrically connected to the timing controller and adapted to externally receive an image signal and to output the received image signal to the timing controller; a replaceable modular system board electrically connected to the first connector and adapted to output video control signals to the flat panel module in accordance with a function allocated thereto; and a chassis adapted to mechanically fix and clamp all components of the flat panel display device and adapted to shield electromagnetic waves generated from the system board, thereby preventing an external discharge of the electromagnetic waves.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 1:
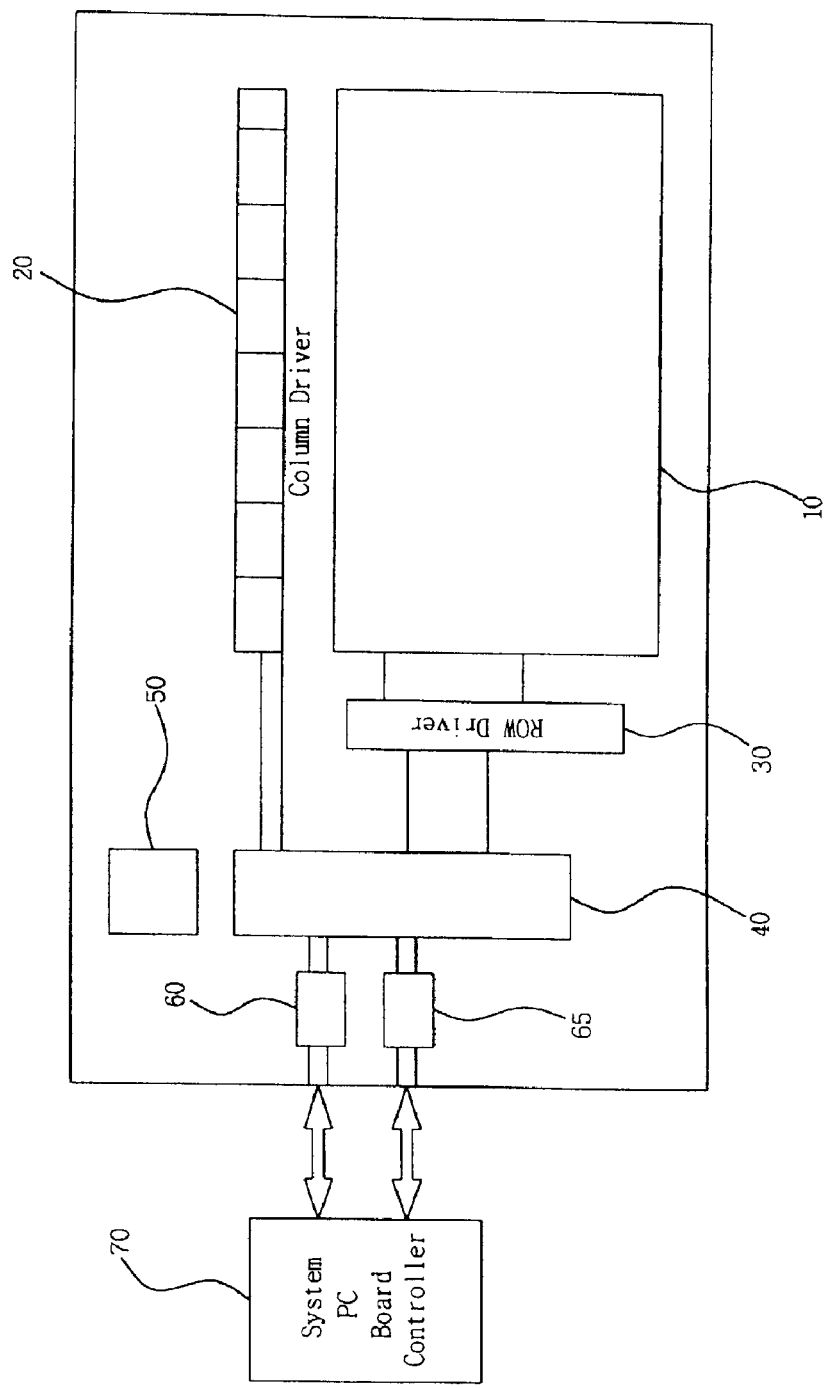
FIG. 1 is a functional block diagram illustrating the conventional flat panel display.
Figure 2:
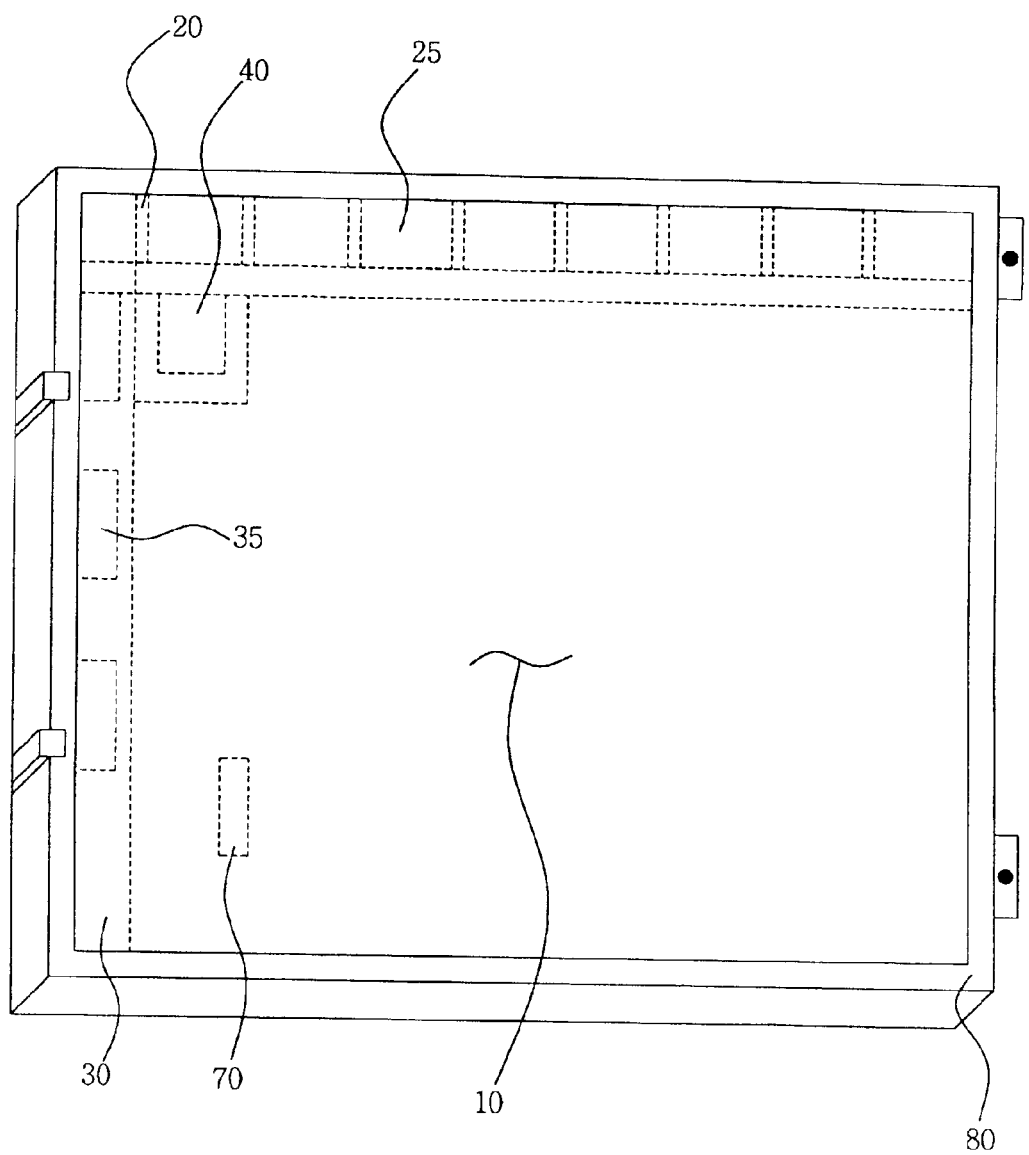
FIG. 2 is a perspective view illustrating the outer structure of the conventional flat panel display.
Figure 3:
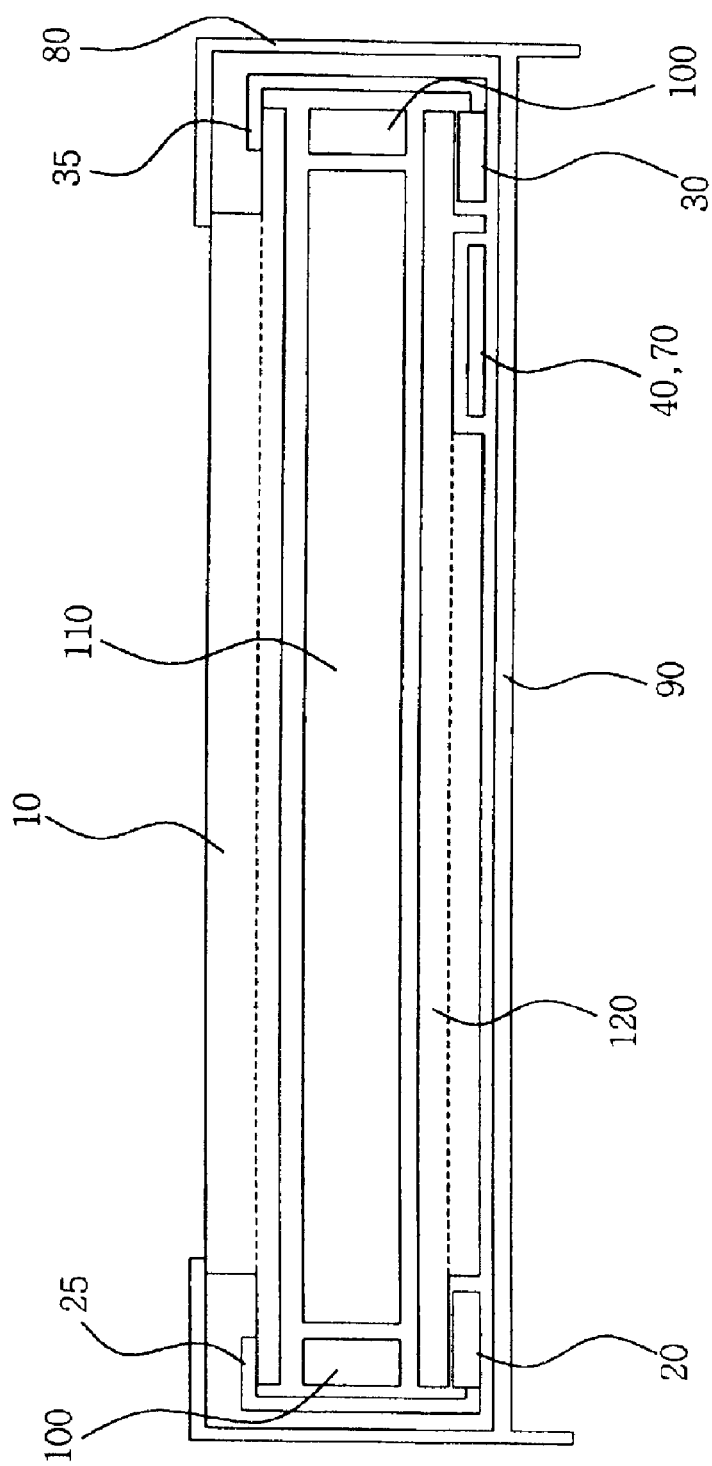
FIG. 3 is a sectional view illustrating the cross-sectional structure of the conventional flat panel display.
Figure 4:
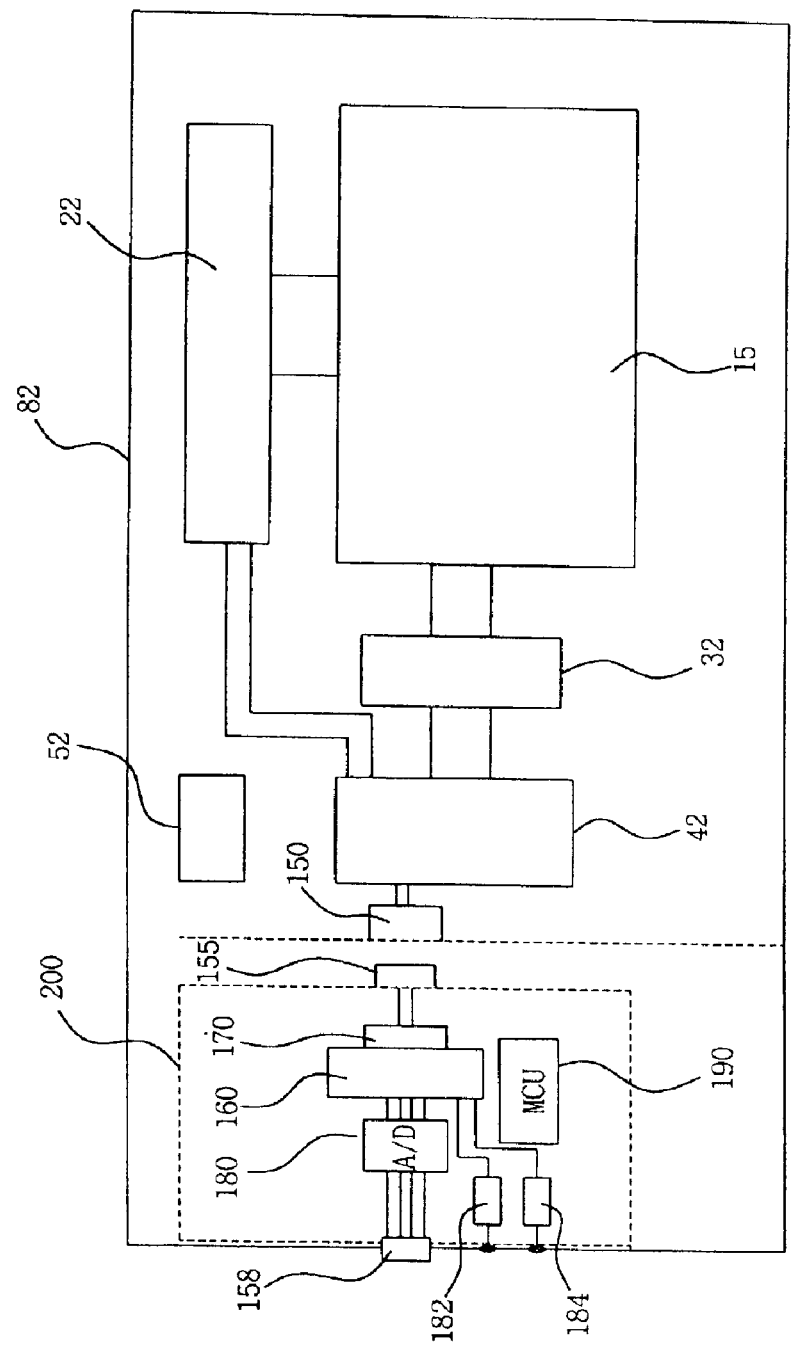
FIG. 4 is a functional block diagram illustrating a flat panel display device according to the present invention.
Figure 5:
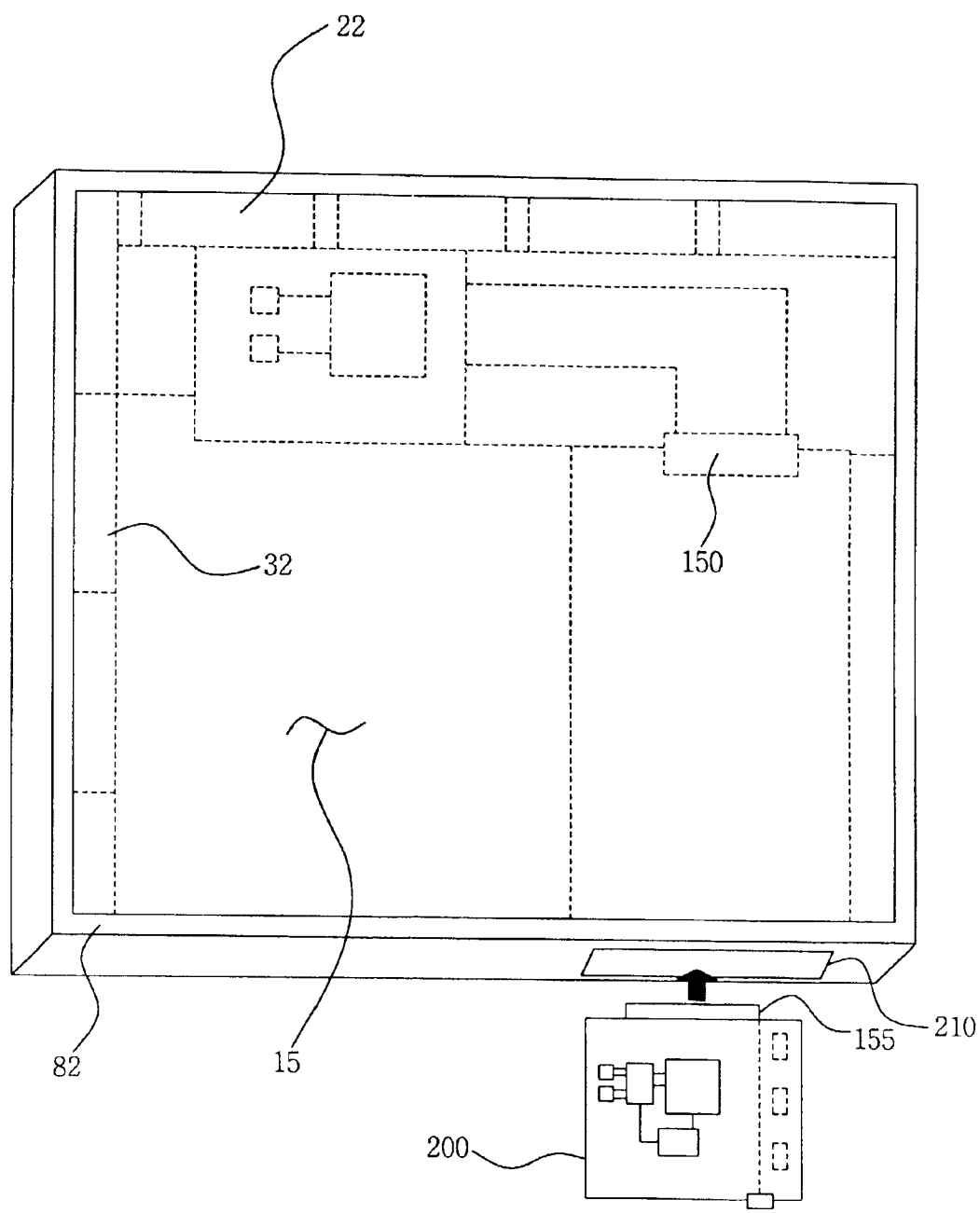
FIG. 5 is a perspective view illustrating the outer structure of the flat panel display device according to the present invention.
Figure 6:
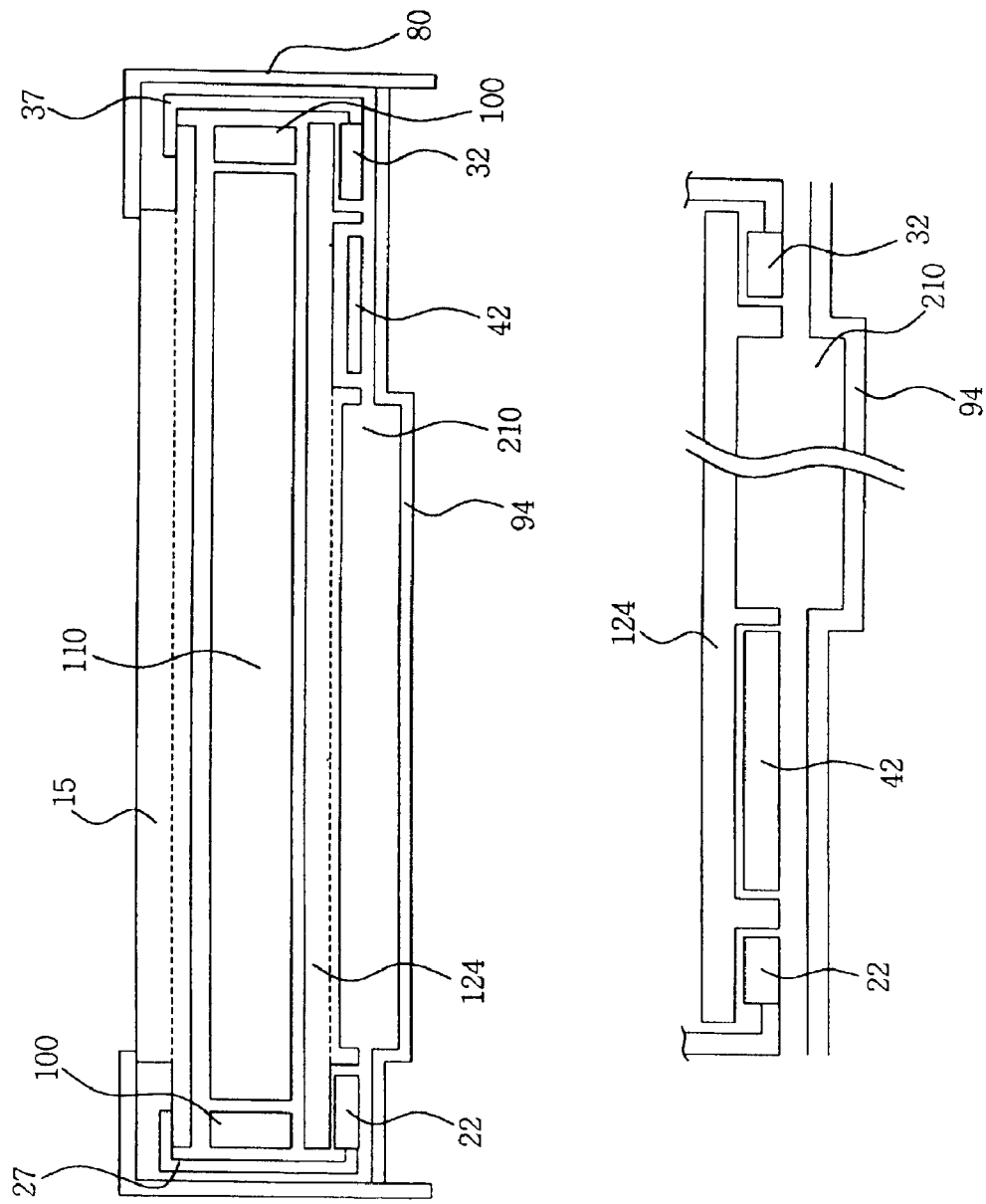
FIG. 6 is a sectional view illustrating the cross-sectional structure of the flat panel display device according to the present invention.

Now, the present invention will be described in detail with reference to an embodiment illustrated in FIGS. 4 to 6. FIG. 4 is a functional block diagram illustrating a flat panel display device according to the present invention. FIG. 5 is a perspective view illustrating the outer structure of the flat panel display device according to the present invention. FIG. 6 is a sectional view illustrating the cross-sectional structure of the flat panel display device according to the present invention.

The flat panel display device of the present invention illustrated in FIG. 4 includes a flat panel module 15 for receiving image control signals applied to column and row control lines and displaying an image through a plurality of LCD pixels based on the received image control signals, column drivers 22 each adapted to output an image control signal to an associated one of the column control lines, thereby driving associated ones of the LCD pixels included in the flat panel module 15, and row drivers 30 each adapted to output an image control signal to an associated one of the row control lines, thereby driving associated ones of the LCD pixels. The flat panel display device also includes a timing controller 42 for controlling the outputting of the image control signals from the column drivers 22 and row drivers 32 adapted to control the flat panel module 15, a buffer 52 for storing a reference voltage for a gray-scale brightness reference, and a first connector 150 electrically connected to the timing controller 42 and adapted to externally receive an image signal and to output the received image signal to the timing controller 42. The flat panel display device further includes a system board 200 electrically connected to the first connector and adapted to output video control signals to the flat panel module in accordance with a function allocated thereto. This system board 200 includes a second connector 155 electrically connected to the first connector 150 and adapted to output a processed image signal for allowing the flat panel module 15 to operate in accordance with a function allocated thereto based on the image control signal, a third connector 158 adapted to externally receive an analog image signal, an analog/digital (A/D) converter 180 for converting the analog image signal received from the third connector 158 into a digital image signal, a video converter 182 for receiving a video signal, externally applied thereto, in a matched state, a digital converter 184 for receiving a digital image signal, externally applied thereto, in a matched state, an image processor 160 for performing an image processing for a signal received from the digital converter 184, a low voltage differential signaling (LVDS) unit 170 for converting a signal outputted from the image processor 160 into a low voltage signal to reduce electromagnetic waves, and a main circuit unit (MCU) 190 for controlling and monitoring the functional units of the system board 200. The flat panel display device also includes a chassis 82 adapted to mechanically fix and clamp all components of the flat panel display device and provided at one side wall thereof with an insertion slot for allowing the system board 200 to be separably mounted in the chassis 82.

The flat panel display device having the above mentioned configuration according to the present invention will be described in more detail.

In the flat panel display device, the timing controller 42 receives the reference voltage from the buffer 52 corresponding to the gray-scale brightness reference for the pixels of the LCD constituting the flat panel module 15. Based on the reference voltage, the timing controller 42 processes an image signal received from the system board 200 connected thereto via the first connector 150. In accordance with this signal processing, the timing controller 42 outputs voltage control signals for controlling the column drivers 22 and row drivers 32, respectively.

Accordingly, the image signal outputted from the system board 200 after being processed by the system board 200 is displayed on the flat panel module 15.

The system board 200 having the above mentioned function externally receives an analog image signal via the third connector 158, and converts the received analog image signal into a digital signal via the A/D converter 180. The system board 200 may also receive a video signal or digital signal. In this case, the system board 200 processes the received video signal or digital signal using the video converter 182 or digital converter 184, thereby outputting an associated digital signal.

The digital image signal outputted from the A/D converter 180 is processed by the image processor 160 in accordance with the function allocated to the image processor 160. The processed image signal is then applied to the LVDS unit 170 so that it is converted into a low voltage level. Since the image signal has a low voltage level, it is possible to suppress an electromagnetic interference (EMI) in a subsequent signal processing.

The image signal processed by the LVDS unit 170 to suppress an EMI is applied to the first connector 150 via the second connector 155, and then inputted to the timing controller 42.

Thus, the application of the flat panel display device is determined by the function allocated to the image processor 160 adapted to process an input image signal. Where it is desired to change the application of the flat panel display device, this can be accomplished only by replacing the modular system board 200 with a new one corresponding to the changed application.

For example, where the system board 200 is adapted for a monitor, it serves to display a data signal inputted from a PC on the flat panel module 15. If the system board 200 is replaced with a new one for a TV, the flat panel display device can be used for a TV. In such a fashion, the flat panel display device of the present invention may be used for an E-book or Web in accordance with a replacement of the system board 200 with a new one for the changed application.

Referring to FIG. 5, the system board 200 included in the flat panel display device of the present invention is separably fitted in the insertion slot 210 provided at one side wall of the chassis 82. The electrical connection of the system board 200 to the flat panel module 15 is provided by a connection between the first and second connectors 150 and 155.

The insertion slot 210 may be arranged at any position on one side wall of the chassis 82, in so far as an easy mounting and separation of the system board 200 is ensured. Although the system board 200 generates a considerable amount of electromagnetic waves due to its image processing function, it is possible to effectively shield or suppress the discharge of electromagnetic waves generated from the system board 200 because the system board 200 operates in a state in which it is received in the chassis 82 through the insertion slot 210.

Thus, the flat panel display device of the present invention may be used for various applications such as a monitor, a TV, an E-book or Web in accordance with a change of the configuration of the system board 200 to meet a desired application. In particular, this can be conveniently achieved in accordance with a preparation of modular system boards having different functions. That is, where it is desired to change the application of the flat panel display device, this can be easily achieved by replacing the system board installed in the flat panel display device with a new one corresponding to the changed application. Accordingly, it is possible to reduce the time and cost taken to change the application of the flat panel display device. In addition, it is unnecessary to use any expensive connection cable for a connection of the system board to the flat panel module because that connection is achieved using connectors.

Referring to FIG. 6, it can be found that the insertion slot 210 is arranged beneath the protective plate 124 to allow an insertion of the system board 200 into the chassis 82.

As apparent from the above description, the present invention provides a flat panel display device capable of changing its application by use of a modular system board having a function corresponding to the changed application and structured to be separably mounted to the flat panel display device.

The mounting of the modular system board to the flat panel display device is achieved by simply inserting the system board into a chassis of the flat panel display device through an insertion slot formed at the chassis. Accordingly, there is an advantage in that the thickness of the flat panel display device can be reduced.

In accordance with the present invention, it is possible to effectively shield or suppress the discharge of electromagnetic waves generated from the system board because the system board is completely received in the chassis through the insertion slot. It is also possible to reduce the time and cost taken to change the application of the flat panel display device. In addition, it is unnecessary to use any expensive connection cable for a connection of the system board to the flat panel module because that connection is achieved using connectors. Thus, there is a reduction in the manufacturing costs.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A flat panel display device comprising:

a flat panel module for receiving image control signals applied to column and row control lines and displaying an image through a plurality of LCD pixels based on the received image control signals;

column drivers each adapted to output an image control signal to an associated one of the column control lines, thereby driving associated ones of the LCD pixels included in the flat panel module;

row drivers each adapted to output an image control signal to an associated one of the row control lines, thereby driving associated ones of the LCD pixels;

a buffer for storing a reference voltage for a gray-scale brightness reference;

a timing controller for controlling the outputting of the image control signals from the column and row drivers;

a first connector electrically connected to the timing controller and adapted to externally receive an image signal and to output the received image signal to the timing controller;

a replaceable modular system board including, a second connector electrically connected to the first connector, a third connector adapted to externally receive an analog image signal, an analog/digital converter for converting the analog image signal received from the third connector into a digital image signal, an image processor for performing an image processing for a signal received from the analog/digital converter, a low voltage differential signaling unit for converting a signal outputted from the image processor into a low voltage signal to reduce electromagnetic waves; and a main circuit unit for controlling and monitoring all components of the system board; and a chassis adapted to mechanically fix and clamp all components of the flat panel display device and is provided at one side wall thereof with an insertion slot for allowing the system board to be separably mounted within the flat panel display device.

2. The flat panel display device according to claim 1, wherein the system board is replaceable with a new one to change the display function of the flat panel module into a display function corresponding to the new system board.

* * * * *